(12) United States Patent
Carlsen

(10) Patent No.: US 6,676,528 B1
(45) Date of Patent: Jan. 13, 2004

(54) TOOL FOR THE MANUFACTURE OF AN OFFSET HEAD NAIL AND A USE OF SAID TOOL

(75) Inventor: Jens Carlsen, Middelfart (DK)

(73) Assignee: Enkotec A/S, Skanderborg (DK)

( * ) Notice: Subject to any disclaimer, the term of this patent is extended or adjusted under 35 U.S.C. 154(b) by 0 days.

(21) Appl. No.: 10/264,929

(22) Filed: Oct. 4, 2002

(51) Int. Cl.[7] .................................................. B21G 3/00
(52) U.S. Cl. ........................ 470/137; 470/34; 470/110; 470/121; 470/192
(58) Field of Search ............................. 470/27, 34, 38, 470/40, 110, 121, 137, 150, 192, 195

(56) References Cited

U.S. PATENT DOCUMENTS

| | | | | |
|---|---|---|---|---|
| 5,020,353 A | * | 6/1991 | Christiansen | 72/187 |
| 5,154,670 A | * | 10/1992 | Sygnator et al. | 470/125 |
| 5,195,931 A | * | 3/1993 | Wright et al. | 470/40 |
| 5,482,419 A | * | 1/1996 | Leistner | 411/442 |
| 5,651,739 A | * | 7/1997 | Carlsen | 470/129 |

FOREIGN PATENT DOCUMENTS

WO    WO 89/03735    5/1989

* cited by examiner

*Primary Examiner*—Ed Tolan
(74) *Attorney, Agent, or Firm*—Pitney, Hardin, Kipp & Szuch LLP

(57) ABSTRACT

The present invention relates to a tool for the manufacture of an offset head nail, said nail comprising a shank and a head, said head being placed with its center being offset to the center of the shank, wherein said tool is one of a set of at least two tools acting mutually on a blank for a nail, said tool comprising a front side with a reception opening and a top side to be used when forming the head, said reception opening being shaped to form an impression in the blank and to fixate said blank during forming of a head on the blank. The invention further relates to a use of the aforementioned tool. Nails with offset heads are used in nail guns, where a strip of nails is used for shooting multiple times before reloading a new strip of nails. Novel and inventive aspects of the tool according to the invention comprise that the reception opening comprises a protruding section by the top side for forming an impression in the shank of said nail, said impression being placed adjacent to the head and mainly to a side, which is opposite the direction in which the head is to be offset, and that the protruding section comprises at least one substantially flat or convex surface for forming at least one substantially flat or concave section on said nail, said flat or convex section being placed substantially parallel to the longitudinal axis of the reception opening. In this way, a high strength is provided of the nail in the transition between the shank and the head.

10 Claims, 10 Drawing Sheets

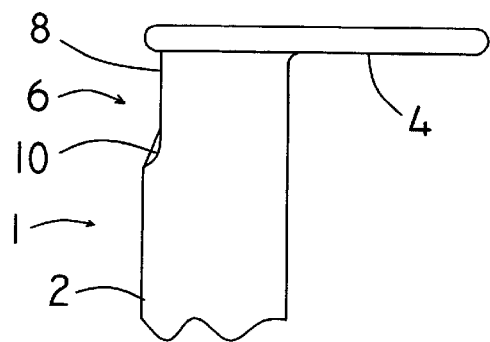 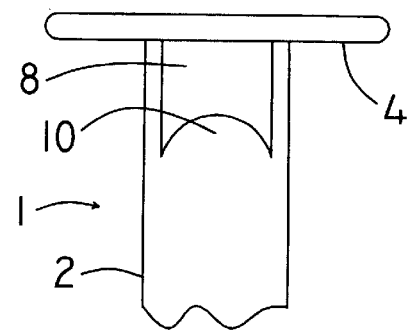
Fig. 3a            Fig. 3b
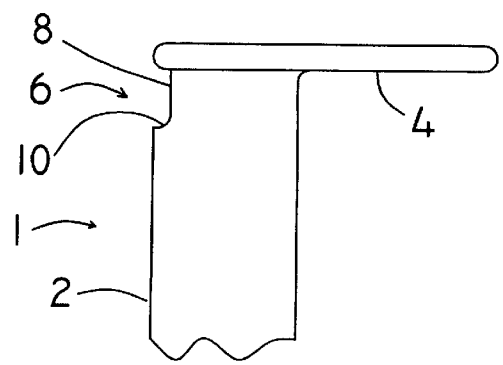 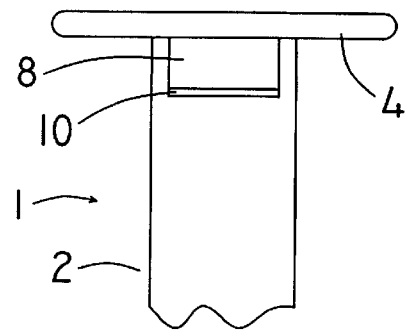
Fig. 4a            Fig. 4b

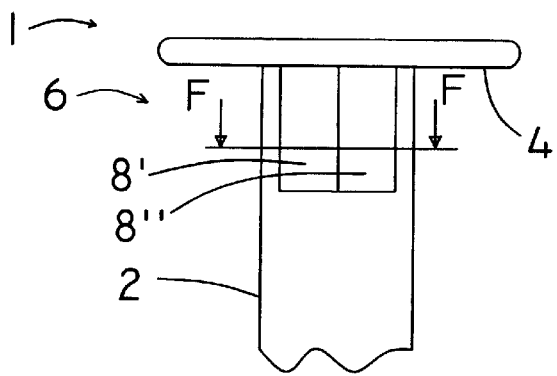
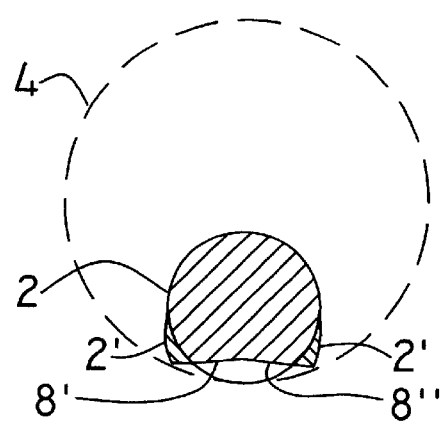
Fig. 5aFig. 5b
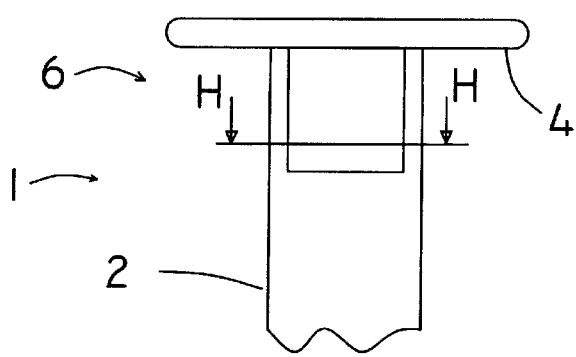
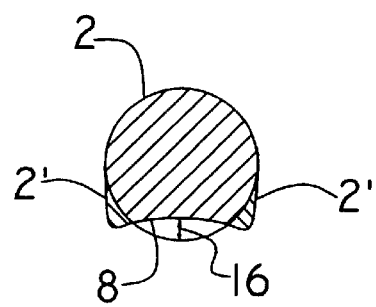
Fig. 6aFig. 6b
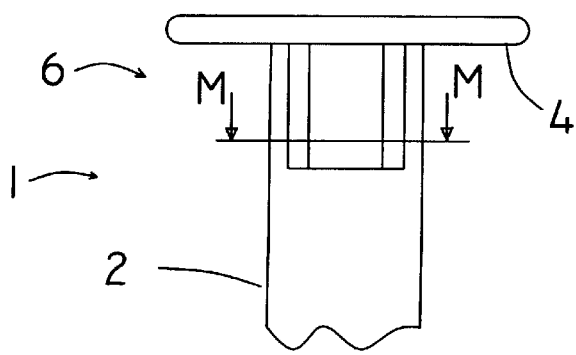
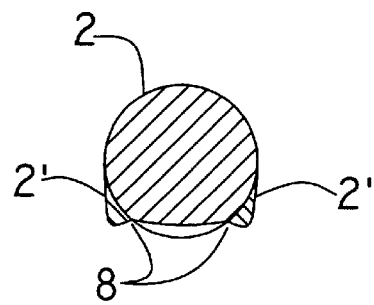
Fig. 6.1aFig. 6.1b

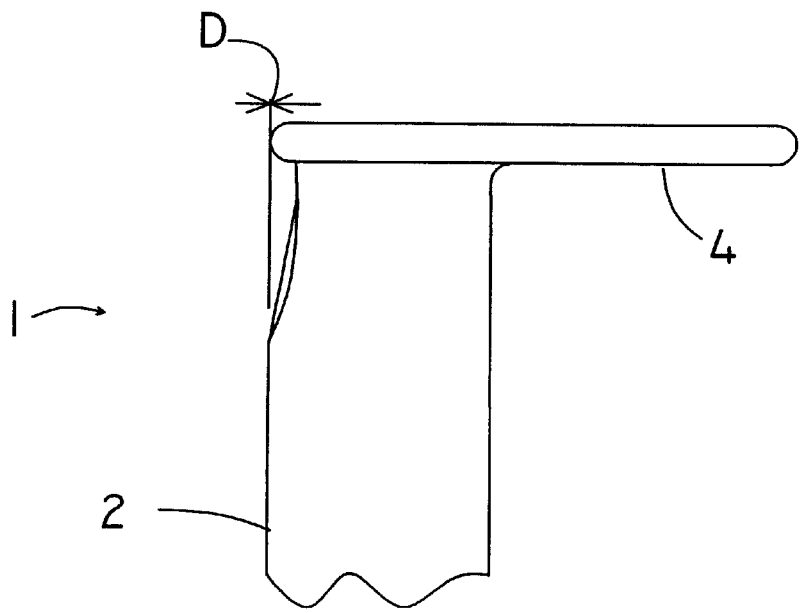
Fig. 17
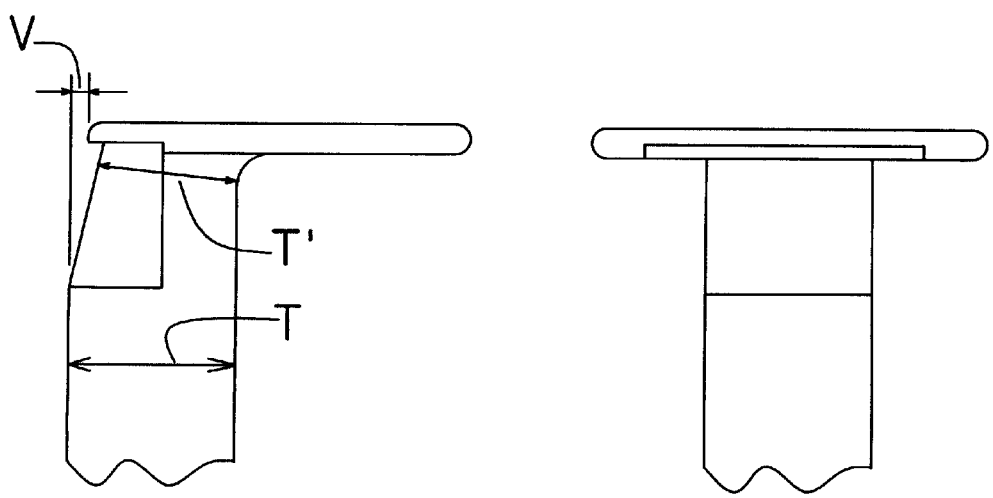
Fig. 18a
(Prior art)
Fig. 18b
(Prior art)

TOOL FOR THE MANUFACTURE OF AN OFFSET HEAD NAIL AND A USE OF SAID TOOL

The present invention relates to a tool for the manufacture of an offset head nail, said nail comprising a shank and a head, said head being placed with its centre being offset to the centre of the shank, wherein said tool is one of a set of at least two tools acting mutually on a blank for a nail, said tool comprising a front side with a reception opening and a top side to be used when forming the head, said reception opening being shaped to form an impression in the blank and to fixate said blank during the forming of a head on the blank. The invention further relates to a use of the aforementioned tool.

Nails with offset heads are used in nail guns, where a strip of nails is used for shooting multiple times before reloading a new strip of nails. The strip of nails has closely adjacently assembled nails, said nails having nail heads which are offset to one side. The offset is necessary in order to have a large head surface freely exposed for shooting off the nail, although the nails, as mentioned, are closely assembled. Nails of this type are known as D-heads and offset heads.

Nails with offset heads etc. are manufactured by mainly the same method as nails without offset heads, i.e. a wire clamped between two oppositely placed tools with an exposed end of the wire outside the tools. The exposed end is then flattened by force, whereby the head is formed. The exposed end is bent before the head forming process, when offset head nails are made. In this way, the material is already offset to one side, when the head is formed.

This process, however, suffers from the drawback that a small portion of the head is not always completely offset and extends slightly in the direction opposite the general offset. This creates problems when the nails are assembled to a strip. Also, fewer nails per length of strip can be assembled. This means that the user of the nail gun must reload more often with a new strip. When the nails are closely assembled, the nail heads are overlapping each other leaving only a small surface exposed for shooting of the nail, said surface being offset from the shank of said nail. Hence, when the surface is impact by the firing of the nail gun, the force introduced is correspondingly offset from the shank. When the nail is shot, the reaction from the object, into which the nail is shot, is concentrated to the centre axis of the shank. The distance between the centre axis of the shank and the offset force on the nail head results in a significant moment of force being introduced on the nail. The nail must have the necessary strength to carry said moment of force. The critical part of the nail, in this respect, is the transition between the nail head and the shank.

An attempt has been made to overcome the problem concerning the small un-offset portion. This has been achieved, but has, however, created a new problem. The small un-offset portion has apparently been removed by constructing the tools with an opening just below the head, said opening having a cross section on the side opposite the direction of the offset, whose cross section is smaller than the related cross section of the wire, whereby the material causing the small un-offset portion is displaced and hence removed. Also, one of the tools apparently has an upper side, which is raised slightly relative to the other tool in order to move more material in the direction of the offset. Such a nail is severely weakened at the critical transition between the head and the shank. For reference, see attached FIGS. 18a and 18b displaying a nail according to the prior art. When the nails are weakened, they have a tendency to cause malfunction in the nail gun. To solve this, the shooting force has to be reduced. When the shooting force is reduced, the use of the nail gun is limited.

Similar strength problems are known from nails with heads, which are not fully offset, but have a reduced un-offset portion.

The object of the present invention is to provide a tool for the manufacture of improved nails with offset heads, where the aforementioned drawbacks of the nails are avoided.

Novel and inventive aspects of the tool, according to the invention, comprise that the reception opening comprises a protruding section by the top side for forming an impression in the shank of said nail, said impression being placed adjacent to the head and mainly to a side, which is opposite the direction in which the head is to be offset, and that the protruding section comprises at least one substantially flat or convex surface for forming at least one substantially flat or concave section on said nail, said flat or convex section being placed substantially parallel to the longitudinal axis of the reception opening.

In this way, a high strength is provided of the nail in the transition between the shank and the head. The high strength is obtained by the protruding section of the tool with the at least one substantially flat or convex surface, said flat or convex surface resulting in a smaller reduction of the area of the cross section by the impression of the nail, than the prior art, and further by the shape of the flat or convex surface, which allows a large amount of the material, which is displaced when the impression is formed, to remain in the side of the shank which is opposite the direction of the offset. When a large amount of material remains in that location, the moment of inertia is largely maintained in the transition between the shank and the head, which is of great importance to maintain strength against the moment of force. Improved strength is obtained both for nails with full head offset as well as nails with a partial head offset.

The protruding section bends the blank further in the direction of the offset, whereby a full offset head may be obtained, i.e. without a small portion of the head being offset and extending slightly in the direction opposite the offset. Also, due to the protruding section, a very firm grip around the blank is obtained. When the tool is used on a continuous manufacturing apparatus, the protruding section also has the positive effect that an effective grip is obtained well before the forming of the head. This is important, since the free end of the blank, which is to become the head, must be bent before the head is formed in order to obtain the offset head. The effective grip assures that the end of the blank may be bent without risk of unwanted displacement of the blank.

The dimensions of flat or convex surface and the sides of the reception opening by said flat or convex surface may preferably be provided in a way, such that the area of the cross section of the shank of the nail by the flat or concave section will be substantially corresponding to the adjacent part of the shank.

Hereby it is obtained that the material of the blank is allowed to yield sideways when the impression is made. This enables the main part of the material to remain in a desired location for high strength of the nail, instead of mainly yielding in the directions of the longitudinal axis of the nail.

The flat or convex surface and the sides of the reception opening by said flat or convex surface may be provided with two grooves, said grooves being placed near the ends of the at least one flat or convex surface, said grooves having an extension with a radius larger than the radius of the part of the reception opening, said part which is not to be engaged in the forming of the impression in the nail.

Such grooves and the location of such grooves result in a displacement of the material of the blank to preferred locations, said locations resulting in a high moment of inertia of the nail in the transition between the head and the shank. To obtain a high moment of inertia in the desired direction, a high amount of material must remain in the side opposite the direction of the offset of the head of the nail.

The sides of the reception opening by the flat or convex surface may comprise areas, said areas having an extension with a radius smaller than the radius of the part of the reception opening, said part which is not to be engaged in the forming of the impression in the nail.

Hereby some of the material on the side of the shank of the nail is displaced in the direction opposite the direction of the offset. This further results in a higher moment of inertia.

In one embodiment, the protruding section may comprise at least one connecting section connecting at least part of the at least one flat or convex section with the bottom of the reception opening, said connecting having a concave surface. The concave surface provides a nail with a convex connecting surface, which improved the strength of the nail.

In a further embodiment, the flat or convex surface may have a smallest height of 0.2 to 2 millimeters.

In a further embodiment, the flat or convex section may have a largest height of 1 to 10 millimeters.

In a further embodiment, the protruding section may have an extension from 0.2 to 1 millimeter. Any extension will have an effect. The optimal effect is however in the interval between 0.2 to 1 millimeter.

In a further embodiment, the protruding section may be provided with a width, which is equal to or less than the width of the blank.

The tool may preferably be used on a continuous process type manufacturing apparatus, but may also be employed on other types of nails making machines. A continuous type manufacturing apparatus is in this context to be understood as an apparatus working according to the principles described e.g. in WO 8903735 "Method of machining an oblong work piece and a machine for performing the method".

In the following, the invention is explained and described with reference to the drawings, which display examples of embodiments or results of the invention.

FIGS. 3a, 3b show an alternative embodiment of the head and the impression portion of a nail made by a tool according to the invention seen from one side and from the backside.

FIGS. 4a, 4b show a further alternative embodiment of the head and the impression portion of a nail made by a tool according to the invention seen from one side and from the backside.

FIG. 5a shows a further alternative embodiment of the head and the impression portion of a nail made by a tool according to the invention seen from the backside.

FIG. 5b shows section F—F of FIG. 5a including an indication of the head marked with a dotted line.

FIG. 6a shows a further alternative embodiment of the head and the impression portion of a nail made by a tool according to the invention seen from the backside.

FIG. 6b shows section H—H of FIG. 6a.

FIG. 6.1a shows a further alternative embodiment of the head and the impression portion of a nail made by a tool according to the invention seen from the backside.

FIG. 6.1b shows section M—M of FIG. 6.1a.

Figure 1A:
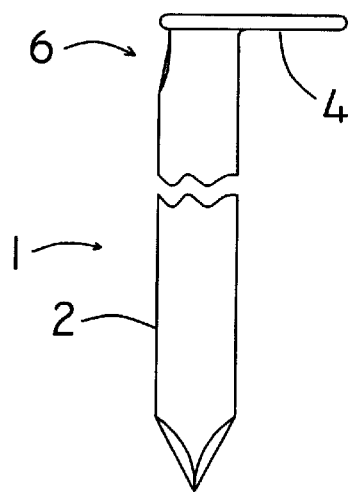
FIGS. 1a, 1b show an embodiment of a nail made by a tool according to the invention seen from one side and from the back.
Figure 1B:
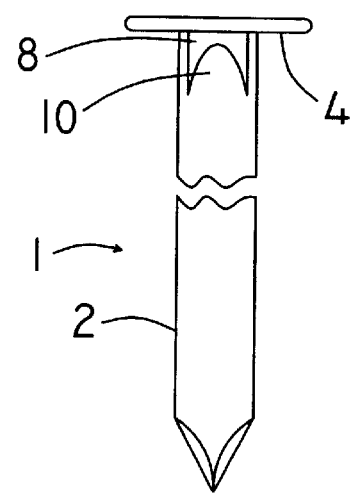
Figure 2A:
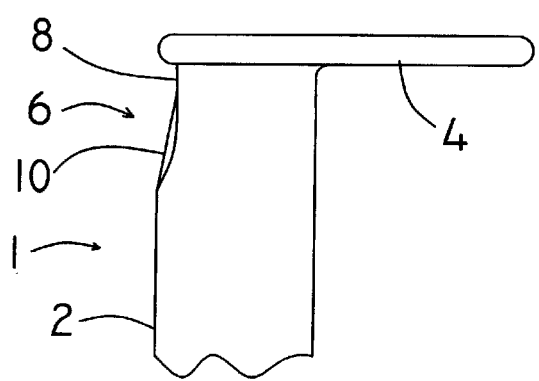
FIGS. 2a, 2b show an embodiment of the head and the impression portion of a nail made by a tool according to the invention seen from one side and from the backside.
Figure 2B:
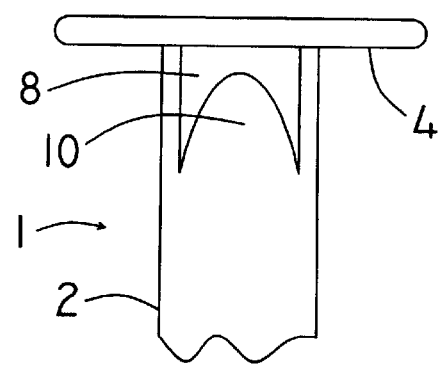
Figure 7:
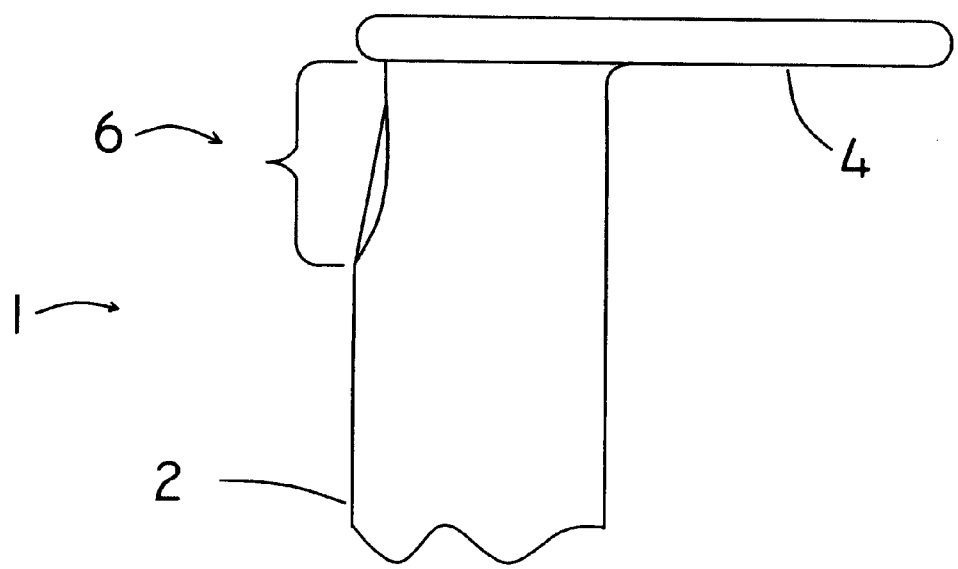

FIG. 7 shows details of an embodiment of the head and the impression portion of a nail made by a tool according to the invention.

Figure 8:
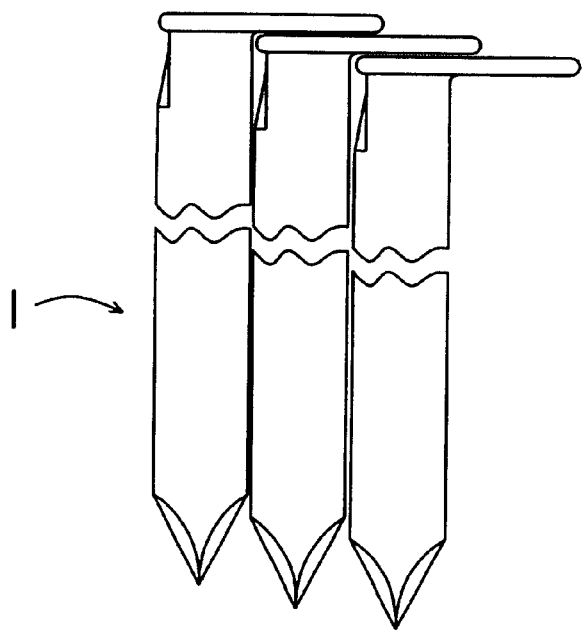

FIG. 8 shows a strip of nails made by a tool according to the invention.

Figure 9:
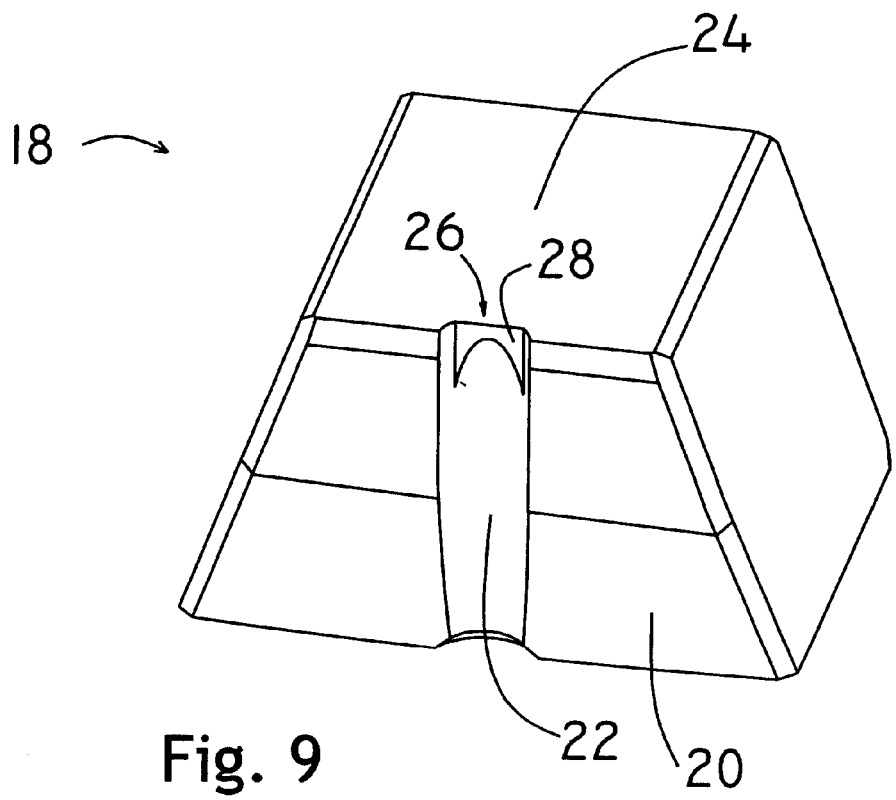

FIG. 9 shows a tool according to the invention seen in an elevated view.

Figure 10:
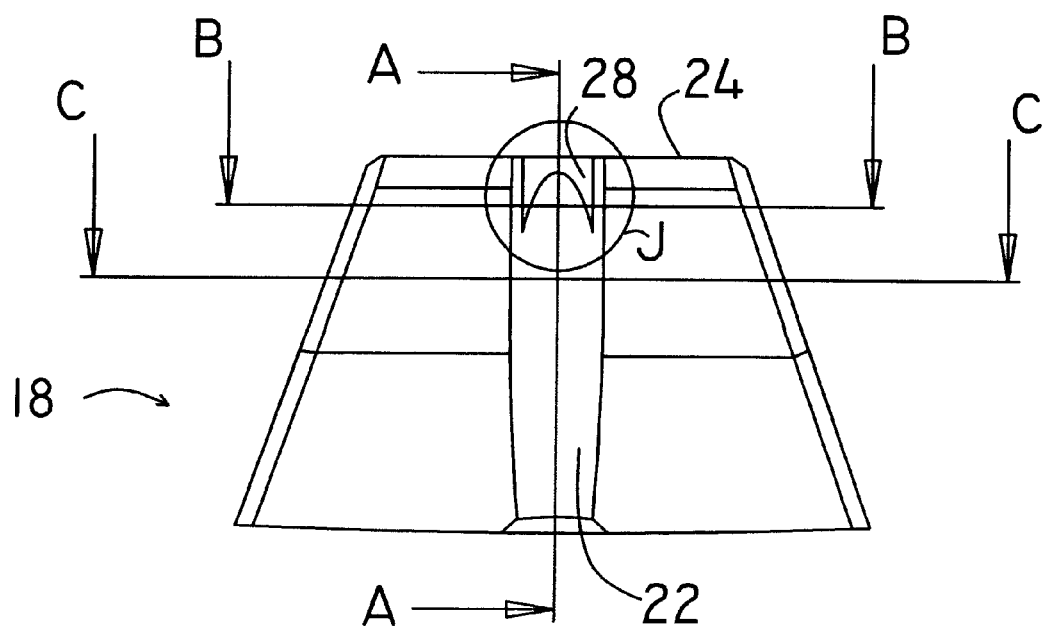

FIG. 10 shows a tool according to the invention seen in a front view.

Figure 11:
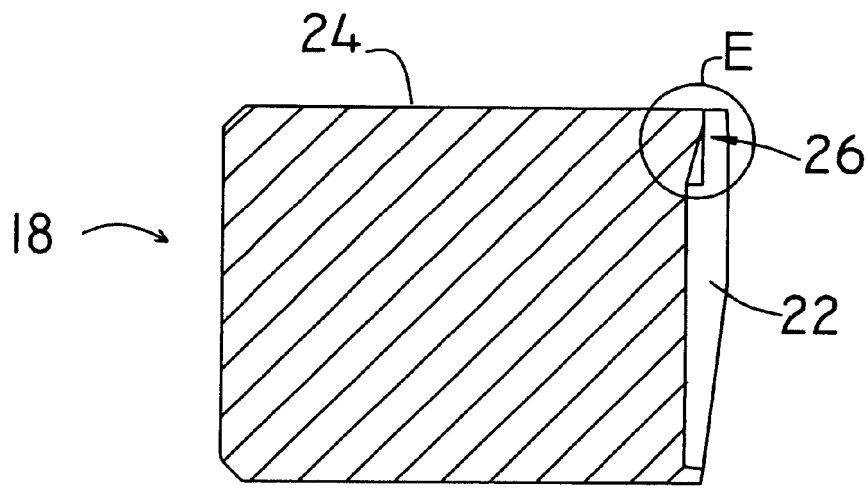
Figure 12:
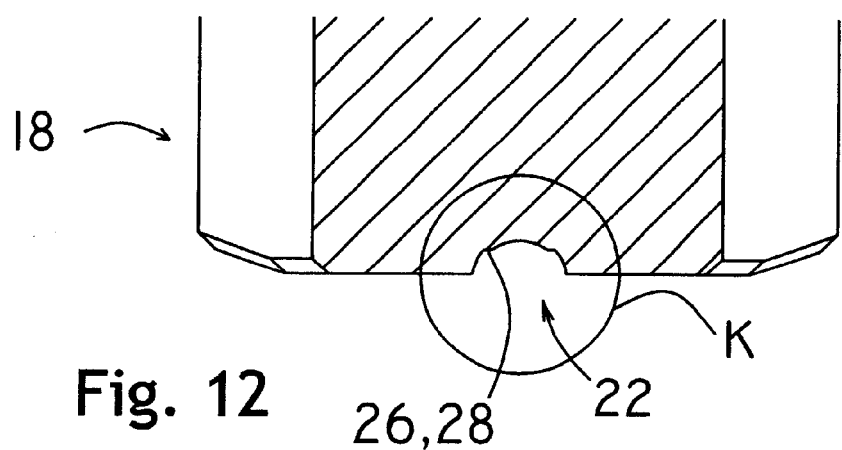
Figure 13:
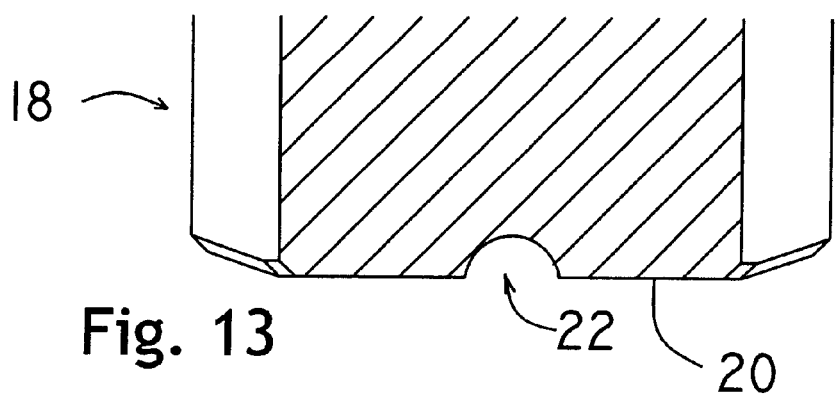

FIGS. 11–13 show section A—A, B—B and C—C of FIG. 10.

Figure 14:
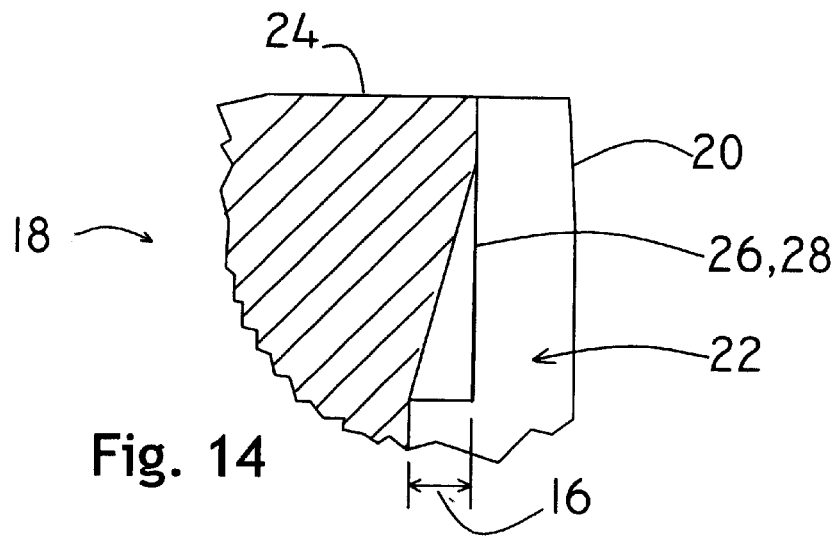

FIG. 14 shows detail E of FIG. 11.

Figure 15:
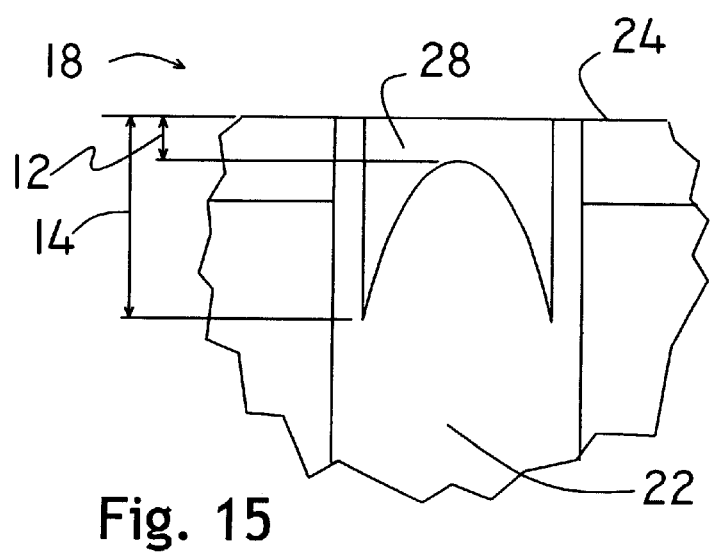

FIG. 15 shows detail J of FIG. 10.

Figure 16:
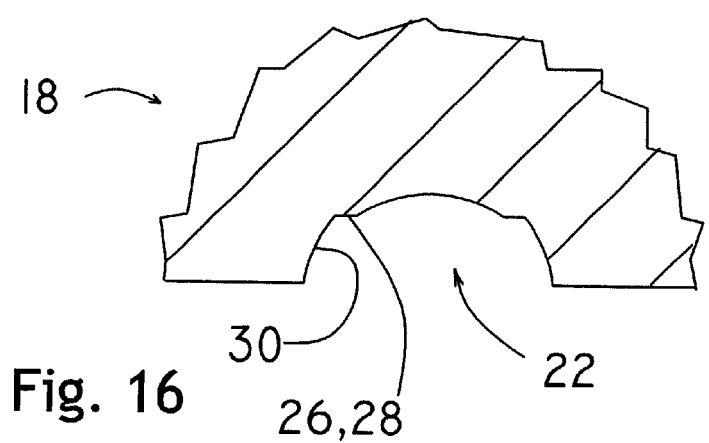

FIG. 16 shows detail K of FIG. 12.

FIG. 17 shows details of an embodiment of the head and the impression portion of a nail made by a tool according to the invention.

FIG. 18a shows the head and the impression portion of a nail according to the prior art seen from the side.

FIG. 18b shows the head and the impression portion of a nail according to the prior art seen from the backside.

Figure 19:
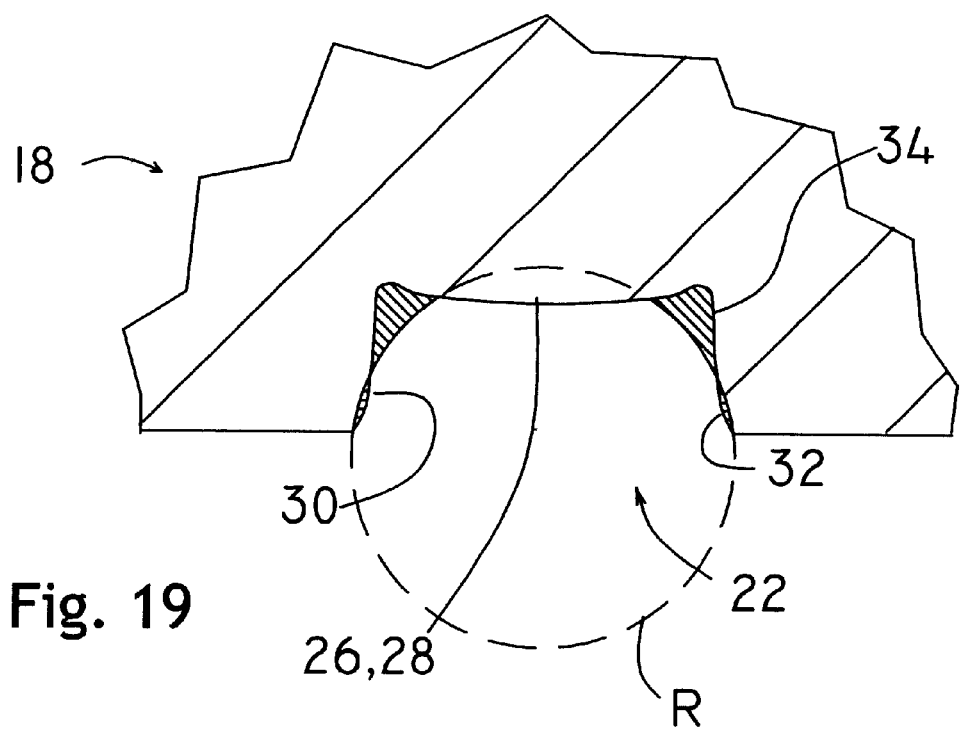

FIG. 19 shows details of an embodiment of the tool according to the invention. The view is a sectional detail view seen similar to detail K of FIG. 12.

Figure 20:
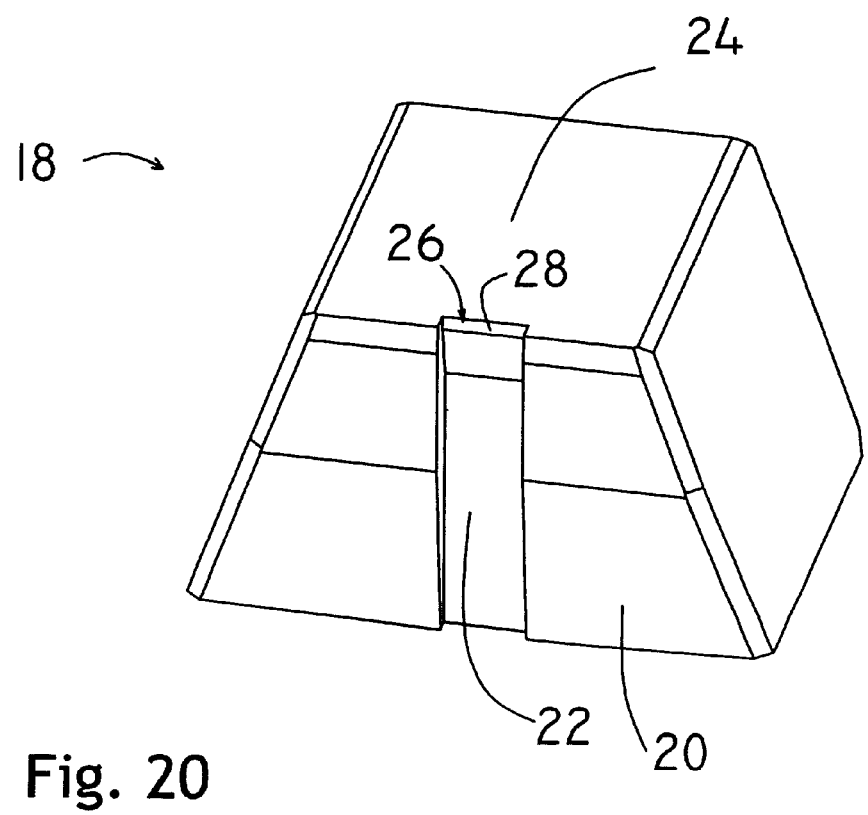

FIG. 20 shows an embodiment of a tool according to the invention seen in an elevated view.

Figure 21:
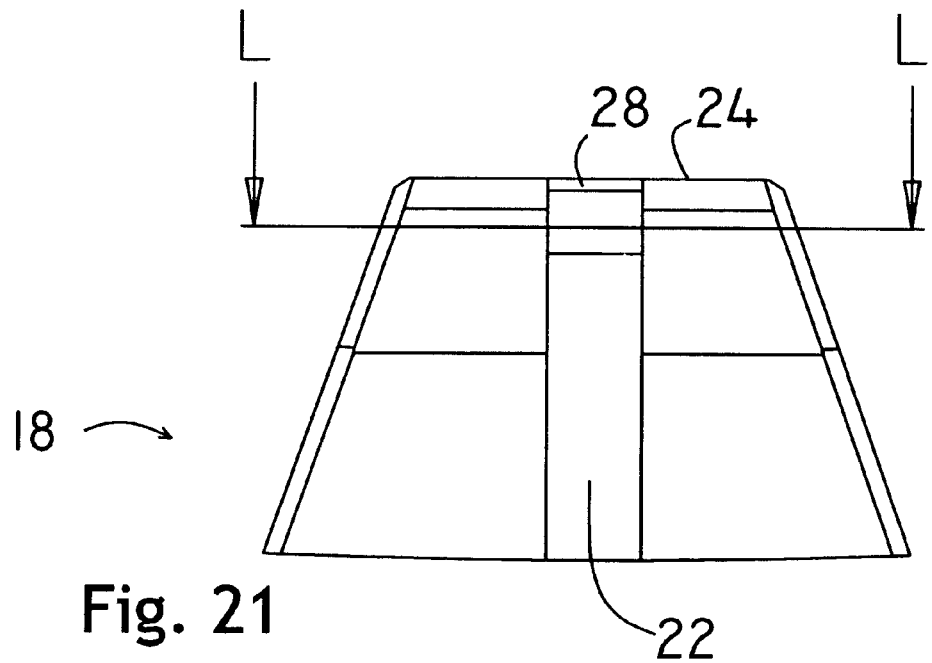

FIG. 21 shows an embodiment of a tool according to the invention seen in a front view.

Figure 22:
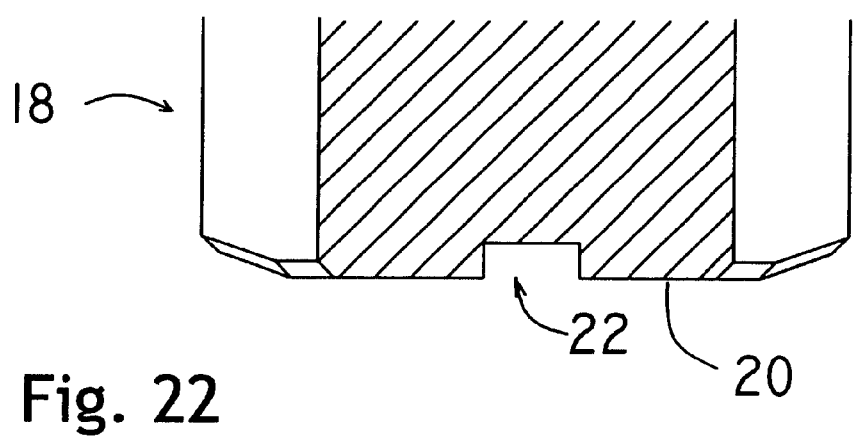

FIG. 22 shows section L—L of FIG. 21.

FIGS. 1a–1b and 2a–2b display a nail 1 with a shank 2 on which shank a head 4 is formed. The head is with a full head offset. By the transition between the head 4 and the shank 2, an impression 6 is formed. The impression 6 comprises a flat or concave section 8 and a connecting section 10 connecting the flat or concave section with the shank 2, said connecting section having a convex surface.

FIGS. 3a–3b display another embodiment of a nail 1 with a shank 2 on which shank a head 4 is formed. By the transition between the head 4 and the shank 2, an impression 6 is formed. The impression 6 comprises a flat section 8 and a connecting section 10 connecting the flat section with the shank 2, said connecting section having a convex surface.

FIGS. 4a–4b display another embodiment of a nail 1 with a shank 2 on which shank a head 4 is formed. By the transition between the head 4 and the shank 2, an impression 6 is formed. The impression 6 comprises a flat section 8 and a connecting section 10 connecting the flat section with the shank 2.

FIGS. 5a–5b display a further embodiment of a nail 1 with a shank 2 on which shank a head 4 is formed. By the transition between the head 4 and the shank 2, an impression 6 is formed. The impression 6 comprises two flat sections 8',8", which are placed at an angle relative to each other, thereby together forming a concave section. In FIG. 5b it is indicated how the shank 2 is deformed by the impression 6, where the areas 2' indicate the positions of the material of the shank, which has been relocated by the forming of the impression. The indications show that the area of the cross section by the impression is not substantially reduced and that a large amount of the material, which was displaced when the impression was formed, remains in the side of the shank, which is opposite the direction of the offset of the head. Thereby, the moment of inertia is largely maintained in the transition between the shank and the head.

FIGS. 6a–6b display a further embodiment of a nail 1 with a shank 2 on which shank a head 4 is formed. By the transition between the head 4 and the shank 2, an impression 6 is formed. The impression 6 comprises a concave section 8. In FIG. 6b it is indicated how the shank 2 is deformed by the impression 6, where the areas 2' indicate the positions of the material of the shank, which has been relocated by the forming of the impression. The indications show that the area of the cross section by the impression is not substantially reduced and that a large amount of the material, which was displaced when the impression was formed, remains in the side of the shank, which is opposite the direction of the offset of the head. Thereby, the moment of inertia is largely maintained in the transition between the shank and the head. The depth of the concave section is marked 16.

FIGS. 6.1a–6.1b display a further embodiment of a nail 1 with a shank 2 on which shank a head 4 is formed. By the transition between the head 4 and the shank 2, an impression 6 is formed. The impression 6 comprises concave sections 8. Between the sections 8, the surface is slightly convex. The general effect is however, that an overall concave impression is present, where material is displaced sideways.

Definitions

The term "convex surface" or "convex section" is in this document to be understood as any outwardly extending surface or section, which may have partial sections which are extending inwardly, but where the overall surface seen as a whole, is extending outwardly.

The term "concave surface" or "concave section" is in this document to be understood as any inwardly extending surface or section, which may have partial sections which are extending outwardly, but where the overall surface or section seen as a whole, is extending inwardly.

In FIG. 6.1b it is indicated how the shank 2 is deformed by the impression 6, where the areas 2' indicate the positions of the material of the shank, which has been relocated by the forming of the impression. The indications show that the area of the cross section by the impression is not substantially reduced and that a large amount of the material, which was displaced when the impression was formed, remains in the side of the shank, which is opposite the direction of the offset of the head. Thereby, the moment of inertia is largely maintained in the transition between the shank and the head.

FIG. 7 displays an embodiment of a nail with a shank 2 on which shank a head 4 is formed. By the transition between the head 4 and the shank 2 an impression 6 is formed.

In FIG. 17 it is displayed that the head 4 is a full offset head, i.e. the distance D is approx. null/zero, in order that the nails 1 may be closely assembled to form a strip for use in a nail gun as displayed in FIG. 8.

In FIGS. 1b, 2b, 3b, 4b, 5a, 6a and 7 the relocated material 2' shown in FIGS. 5b and 6b is not shown for simplicity.

FIGS. 9–16 display a tool 18 comprising a front side 20 with a reception opening 22 and a topside 24. The reception opening comprises a protruding section 26 placed near the topside, said protruding section comprising a substantially flat surface 28. The reception opening 22 comprises sides 30. The surface 28 may in other embodiments be a number of surfaces, which may form a convex of a substantially flat general shape. The surface 28 may in other embodiments be formed with a purely convex shape or with one or more partially concave sections, however with an overall convex shape.

In general, the shape of the substantially flat or convex surface may enhance the relocation of material as indicated by the areas 2' on FIGS. 5b, 6b and 6.1b.

The protruding section 26 provides a very firm grip about a blank. The head of a nail is formed by forcing a free end of a blank against the topside 24. The blank is, in that situation, clamped by the tool 18 and another tool (not displayed) acting from an opposite side.

In FIG. 14 the extension of the protruding section is marked 16.

In FIG. 15 the flat or convex surface 28 has a smallest height 12 and a largest height 14.

FIGS. 18a and 18b display a nail according to the prior art. The nail is with a full offset head, where the head is fully offset with a clearing V. The width of the shank is marked T and the reduced width in the transition between the head and the shank is marked T'. The small portion normally extending outside the shank in the direction opposite the direction of the offset (un-offset portion) has apparently been removed by constructing the tools for making the nail with an opening just below the head, said opening having a cross section, on the side opposite the direction of the offset, whose cross section is smaller than the related cross section of the wire, whereby the material causing the small un-offset portion is displaced and hence removed. Also, one of the tools apparently has an upper side, which is raised slightly relative to the other tool, in order to move more material in the direction of the offset. Such a nail is severely weakened at the critical transition between the head and the shank.

FIG. 19 displays a detail of a cross section of a tool 18, said cross section being perpendicular to a reception opening 22 and through a protruding section 26. A convex surface 28 of the protruding section is displayed. The diameter of the part of the reception opening 22, said part which is not to be engaged in the forming of the impression in the nail, is indicated by the dotted line R. At the right and left ends of the convex surface grooves 34 are placed. The grooves 34 are shown as hatched areas. The grooves 34 provide space into which the material of the blank may flow during the forming of an impression. The grooves are provided with a radius, which is larger the radius of R, in order that the material of the blank may be displaced to locations, where the material adds greatly to the moment of inertia of the shank.

By the sides 32 of the reception opening 22, the radius is smaller than R. The material of the blank is thereby displaced in the direction of the grooves 34, which further adds to the moment of inertia of the nail.

FIGS. 20–22 display a tool 18 comprising a front side 20 with a reception opening 22 and a topside 24. The reception opening comprises a protruding section 26 placed near the topside, said protruding section comprising a substantially flat surface 28. Such a tool may be used for making offset head nails with a shank, said shank having a cross section which is square or square-like.

In a preferred embodiment, the tool may be used for the manufacture of a nail provided with a D-head or with a full head offset.

The invention may of course also be used for nails not having a full offset head, but only a partly offset. The invention may be used for nails with any cross section such as circular, square, square with longitudinal impressions, oval etc.

It is to be understood that the invention as disclosed in the description and in the figures may be modified and changed and still be within the scope of the invention as claimed hereinafter.

What is claimed is:

1. A tool for the manufacture of an offset head nail, said nail comprising a shank and a head, said head being placed with its centre being offset to the centre of the shank, wherein said tool is one of a set of at least two tools acting mutually on a blank for a nail, said tool comprising a front side with a reception opening and a top side to be used when forming the head, said reception opening being shaped to form an impression in the blank and to fixate said blank during the forming of a head on the blank, and wherein the reception opening comprises a protruding section by the top side for forming an impression in the shank of said nail, said impression being placed adjacent to the head and mainly to a side, which is opposite the direction in which the head is to be offset, and wherein the protruding section comprises at least one substantially flat or convex surface for forming at least one substantially flat or concave section on said nail, said flat or convex section being placed substantially parallel to the longitudinal axis of the reception opening.

2. A tool according to claim 1, wherein the dimensions of flat or convex surface and the sides of the reception opening by said flat or convex surface are provided in a way, such that the area of the cross section of the shank of the nail by the flat or concave section will be substantially corresponding to the adjacent part of the shank.

3. A tool according to claim 1, wherein the flat or convex surface and the sides of the reception opening by said flat or convex surface is provided with two grooves, said grooves being placed near the ends of the at least one flat or convex surface, said grooves having an extension with a radius larger than the radius of the part of the reception opening, said part which is not to be engaged in the forming of the impression in the nail.

4. A tool according to claim 1, wherein the sides of the reception opening by the flat or convex surface comprise areas, said areas having an extension with a radius smaller than the radius of the part of the reception opening, said part which is not to be engaged in the forming of the impression in the nail.

5. A tool according to claim 1, wherein the protruding section comprises at least one connecting section connecting at least part of the at least one flat or convex section with the bottom of the reception opening, said connecting section having a concave surface.

6. A tool according to claim 1, wherein the flat or convex surface has a smallest height of 0.2 to 2 millimeters.

7. A tool according to claim 1, wherein the flat or convex section has a largest height of 1 to 10 millimeters.

8. A tool according to claim 1, wherein the protruding section has an extension from 0.2 to 1 millimeter.

9. A tool according to claim 1, wherein the protruding section is provided with a width, which is equal to or less than the width of the blank.

10. Use of a tool according to claim 1, wherein the tool is used on a continuous process type manufacturing apparatus.

* * * * *